United States Patent
Simmonds et al.

(10) Patent No.: US 9,507,149 B2
(45) Date of Patent: Nov. 29, 2016

(54) IMAGE COMBINER

(75) Inventors: Michael David Simmonds, Ashford (GB); Alexander Angus Cameron, Rochester (GB); Colin Richard Mills, Maidstone (GB)

(73) Assignee: BAE SYSTEMS plc, London (GB)

( * ) Notice: Subject to any disclaimer, the term of this patent is extended or adjusted under 35 U.S.C. 154(b) by 25 days.

(21) Appl. No.: 13/880,394

(22) PCT Filed: Oct. 13, 2011

(86) PCT No.: PCT/EP2011/067890
§ 371 (c)(1),
(2), (4) Date: Apr. 19, 2013

(87) PCT Pub. No.: WO2012/052352
PCT Pub. Date: Apr. 26, 2012

(65) Prior Publication Data
US 2013/0208352 A1    Aug. 15, 2013

(30) Foreign Application Priority Data

Oct. 19, 2010  (EP) .................................... 10251810
Oct. 19, 2010  (GB) .................................. 1017621.2

(51) Int. Cl.
*G06K 7/10*        (2006.01)
*G02B 27/01*       (2006.01)
(Continued)

(52) U.S. Cl.
CPC ............ *G02B 27/0101* (2013.01); *G02B 6/34* (2013.01); *G02B 6/4298* (2013.01); *G02B 23/12* (2013.01);
(Continued)

(58) Field of Classification Search
USPC ................... 359/350, 567; 345/690; 348/659
See application file for complete search history.

(56) References Cited

U.S. PATENT DOCUMENTS 4,711,512 A     12/1987  Upatnieks
5,502,455 A *    3/1996  Ferrin et al. ...................... 345/9
(Continued)

FOREIGN PATENT DOCUMENTS

EP          2 196 729 A1    6/2010
WO    WO 2009/050504 A1    4/2009
(Continued)

OTHER PUBLICATIONS

Notification Concerning Transmittal of International Preliminary Report on Patentability (Chapter I of the Patent Cooperation Treaty (Form PCT/IB/326), International Preliminary Report on Patentability (Form PCT/IB/373) and the Written Opinion of the International Searching Authority (Form PCT/ISA/237) issued on May 2, 2013, in the corresponding International Application No. PCT/EP2011/067890. (6 pages).

(Continued)

*Primary Examiner* — Bumsuk Won
*Assistant Examiner* — Balram Parbadia
(74) *Attorney, Agent, or Firm* — Finch & Maloney PLLC

(57) ABSTRACT

An image combiner for a viewing device, such as a night vision device, is disclosed for combining a first image, such as generated symbology, with a second image, such as a view of an outside scene in reduced lighting conditions. A waveguide is provided for capturing the first image from a first viewing direction, and for directing the first image in a second viewing direction, the second viewing direction being substantially coincident with a viewing direction of the second image, such that the first image can combine with the second image. At least a portion of the waveguide is arranged to substantially transmit the second image, such that the second image can pass substantially through the waveguide.

21 Claims, 2 Drawing Sheets

(51) Int. Cl.

| | |
|---|---|
| *G02B 6/34* | (2006.01) |
| *G02B 6/42* | (2006.01) |
| *G02B 23/12* | (2006.01) |
| *G02B 27/10* | (2006.01) |
| *G02B 5/18* | (2006.01) |
| *G02B 6/00* | (2006.01) |

(52) U.S. Cl.
CPC ....... *G02B 27/1066* (2013.01); *G02B 27/1086* (2013.01); *G02B 5/18* (2013.01); *G02B 6/00* (2013.01); *G02B 2027/0118* (2013.01); *G02B 2027/0123* (2013.01)

(56) References Cited

U.S. PATENT DOCUMENTS

| | | | | |
|---|---|---|---|---|
| 6,140,980 | A * | 10/2000 | Spitzer et al. | 345/8 |
| 6,421,031 | B1 * | 7/2002 | Ronzani et al. | 345/8 |
| 7,053,928 | B1 * | 5/2006 | Connors et al. | 348/164 |
| 7,345,277 | B2 * | 3/2008 | Zhang | 250/330 |
| 2003/0142405 | A1 * | 7/2003 | Hoose | G02B 5/18 359/567 |
| 2004/0004767 | A1 * | 1/2004 | Song | 359/566 |
| 2004/0233488 | A1 * | 11/2004 | Kasai et al. | 359/15 |
| 2006/0018020 | A1 * | 1/2006 | Hikichi | G02B 5/1866 359/569 |
| 2006/0132914 | A1 * | 6/2006 | Weiss et al. | 359/462 |
| 2008/0247048 | A1 | 10/2008 | Francois et al. | |
| 2010/0214659 | A1 | 8/2010 | Levola | |

FOREIGN PATENT DOCUMENTS

| | | |
|---|---|---|
| WO | WO 2009/077774 A1 | 6/2009 |
| WO | WO 2010/067114 A1 | 6/2010 |
| WO | WO 2010/067116 A1 | 6/2010 |

OTHER PUBLICATIONS

International Search Report (PCT/ISA/210) issued on Dec. 7, 2011, by the European Patent Office as the International Searching Authority for International Application No. PCT/EP2011/067890.
European Search Report issued on Feb. 1, 2011.
United Kingdom Search Report issued on Feb. 21, 2011.
Don Jarrett et al., "Visual Anomalies and Display Night Vision Goggles", Proceeding of SPIE, vol. 5079, Jan. 1, 2003, pp. 184-195, XP-55012487.

* cited by examiner

IMAGE COMBINER

The present invention relates to an image combiner and particularly, but not exclusively to an image combiner for night vision apparatus.

U.S. Pat. No. 5,502,455 discloses apparatus for superimposing symbology upon a dimly lit view of an outside scene using a night vision device. The night vision device disclosed in U.S. Pat. No. 5,502,455 is illustrated schematically in FIG. 1 of the drawings. Referring to FIG. 1a of the drawings, the night vision device 10 comprises an ocular 11 having an optical aperture 11a which is arranged to receive light from the outside scene in the direction of the arrows indicated by the numeral 12. The device 10 is further arranged to receive symbology generated in a Cathode Ray Tube 13, via a mirror and lens arrangement 14a, 14b, and a reflecting prism 15, the latter of which is mounted substantially in front of the aperture 11a. The reflecting prism 15 is held in place by a series of support arms 16, as illustrated in FIG. 1b of the drawings, which in combination with the prism 15 obscure the entrance to the device 10.

In reduced lighting conditions, only a small amount of light will enter the ocular 11. The obstruction created by the prism 15 and support arms 16 further reduces the light from the outside scene entering the ocular 11. Accordingly, upon entering the ocular 11, the light is subject to intensification using an intensifier (not shown). However, since the scene image is combined with a relatively brighter symbology image, the luminance of the symbology image must be diminished to prevent damaging the intensifier and to prevent the symbology image obscuring the scene image. The obstruction caused by the prism 15 and support arms 16 requires the use of a small prism. However, a small prism 15 is found to limit the angular range or the field of view of the symbology which is visible to the user.

We have now devised an image combiner which alleviates the above-mentioned problems.

According to a first aspect of the present invention there is provided a viewing device for viewing in reduced lighting conditions, comprising:

an image projector for generating a first image comprising radiation in a first wavelength range for overlaying a second image comprising a view of an outside scene in reduced lighting conditions comprising radiation in a second wavelength range, the first range being separated from the second range;

a housing for housing a lens arrangement, the housing comprising an inlet aperture for receiving the first and the second images into the lens arrangement, an outlet for viewing the first image combined with the second image and an image intensifier for intensifying at least the second image;

the device further comprising an image combiner for combining the first image with the second image, the combiner comprising a waveguide comprising means for capturing the first image from the image projector for transmission along the waveguide and an output diffraction grating for diffracting radiation in the first wavelength range in a viewing direction, the viewing direction of the first image being substantially coincident with a viewing direction of the second image, such that the first image can overlay the second image, wherein the diffraction grating is arranged to substantially transmit radiation in the second wavelength range, such that the second image can pass substantially through the waveguide.

In this manner, the waveguide thus prevents minimal obstruction to radiation from an outside scene for example, since the waveguide is substantially transparent to radiation from the outside scene.

The first image may comprise generated symbology and the second image may comprise a view of an outside scene in reduced lighting conditions, such that the viewing device is arranged to present a combined first and second image to a user.

The means for capturing the first image may be disposed at a first position on the waveguide and the diffraction grating may be disposed at a second position on the waveguide.

The first position may be displaced along the waveguide with respect to the second position.

The second position may comprise a distributed position, such that the output diffraction grating is arranged to extend along the waveguide. In this respect, the first image is directed from the waveguide at a distributed position so that the image is visible to the user over a wide angular range, namely a wide field of view.

The output diffraction grating may be arranged to extend substantially across the inlet aperture.

The means for capturing the first image may comprise an input diffraction grating.

The first wavelength range may comprise radiation including green light and the second wavelength range comprises radiation including near infra-red light.

The pitch of the output diffraction grating may be selected so the output diffraction grating substantially diffracts radiation in the first wavelength range and substantially transmit radiation in the second wavelength range.

The image combiner may be optimised to intensify the second image more than the first image.

At least the second position of the waveguide may be arranged to substantially transmit the second image, such that the second image can pass substantially through the waveguide at the second position.

The first image may comprise generated symbology. The first image may be generated using an image projector, such as a miniature cathode ray tube or a digital micro-display projector. The second image may comprise a view of an outside scene in reduced lighting conditions, such as an outside scene at night. In this respect, the image combiner may be arranged to superimpose the generated symbology on the view of the outside scene.

The image combiner may further comprise a lens arrangement for manipulating the combined first and second image. The lens arrangement may comprise an inlet aperture for receiving the first and second images into the arrangement and the second grating may be arranged to extend substantially across the inlet aperture.

The first image may include radiation having a wavelength in a first wavelength range and the second image may include radiation having a wavelength in a second wavelength range. The first and second wavelength ranges may be separate wavelength ranges. The first image, namely the symbology, is typically generated using green light having a wavelength in the range of 515 nm to 545 nm and preferably substantially 530 nm. The second image, namely the view of the outside scene, comprises substantially infra-red wavelengths in the range 600 nm to 900 nm.

The waveguide may comprise a substantially planar waveguide. The waveguide may be arranged to guide the first image from the first position to the second position via total internal reflection.

An embodiment of the present invention will now be described by way of example only and with reference to the accompanying drawings, in which.

Figure 1:
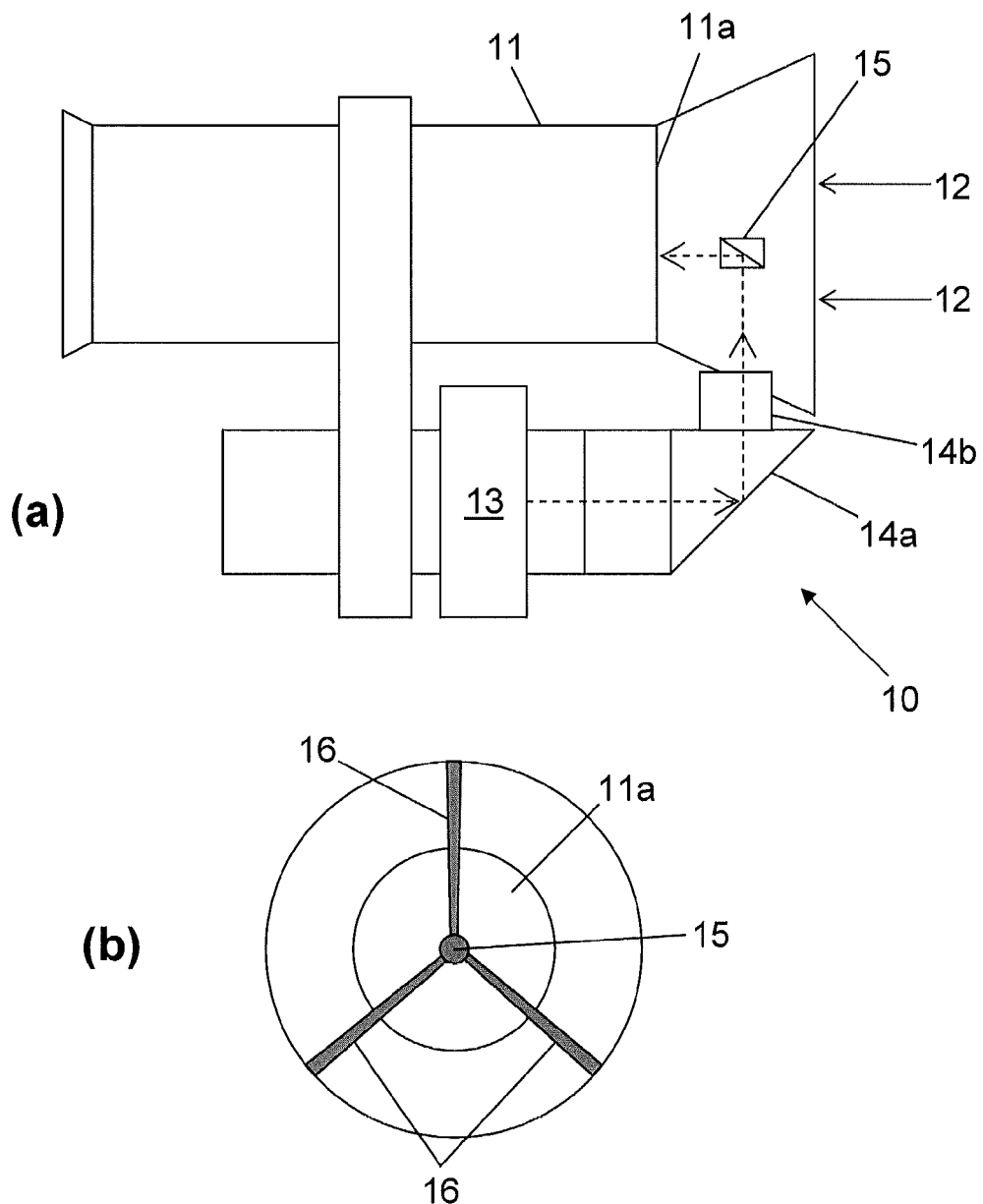
FIG. 1a is a schematic side view illustration of a prior art night vision device.
FIG. 1b is a view of the inlet aperture to the night vision device of FIG. 1a, in the direction of arrow A.
Figure 2:
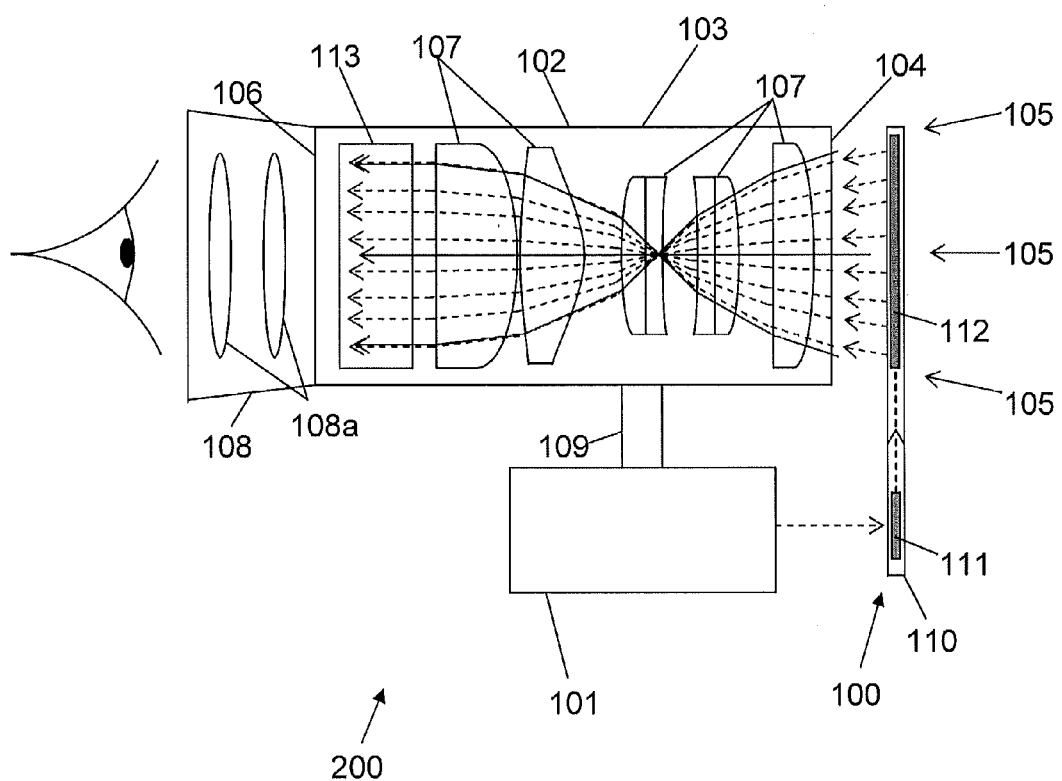
FIG. 2 is a schematic illustration of a sectional view along a viewing device comprising an image combiner according to an embodiment of the present invention.

Referring to FIG. 2 of the drawings, there is illustrated a sectional view of an image combiner 100 according to an embodiment of the present invention, incorporated within a viewing device 200 according to an embodiment of the present invention. The combiner 100 comprises a collimating image projector 101 for generating symbology (as illustrated with the dashed lines) to be overlaid upon a view of an outside world scene (as illustrated with the solid lines) which may comprise a static image or a dynamic image. The combined image is viewed via a viewing element 102 of the viewing device 200, which may comprise a night vision device, for example.

The viewing element 102, which may comprise an ANVIS™, AN/VIS-9 or similar, comprises a housing 103 having an inlet 104 for receiving radiation from the outside world scene, into the housing in the direction indicated by arrow 105, and an outlet 106 through which radiation can exit the housing 103 to be viewed by a user (not shown). The housing 103 further comprises an objective lens arrangement 107 disposed between the inlet 104 and the outlet 106 for manipulating the radiation which passes through the housing 103 between the inlet 104 and the outlet 106. The viewing element 102 further comprises an eyepiece 108 comprising an eyepiece lens arrangement 108a for focusing the combined image for viewing by the user (not shown), for example.

The projector 101 is rigidly coupled to the viewing element 102 via a clamp 109 or similar, such that a longitudinal axis of the projector and a longitudinal axis of the viewing element 102 are substantially parallel. The image generated by the projector 101 is directed into the viewing element 102 via a planar waveguide 110, which may comprise a high index optical glass, such as the Schott™ N-SF6 glass. The waveguide 110 is orientated substantially transverse to the longitudinal axis of the projector 101 and viewing element 102 extends from a position which is substantially in front of the inlet 104 to the viewing element 102, to a position substantially in front of the projector 101 for receiving the projector image. The portion of the waveguide disposed adjacent the projector 101 comprises a first diffraction grating 111 which may be disposed upon the waveguide 110 or formed integrally therewith. The first grating 111 may comprise a region of the waveguide 110 having a periodic variation in refractive index, or a blazed grating, for example, and is arranged to couple the image radiation from the projector 101 with the waveguide 110, so that the image can pass along the waveguide 110 via total internal reflection at the surface thereof, to a position disposed adjacent the inlet 104 to the viewing element 102.

The portion of the waveguide 110 disposed adjacent the inlet 104 comprises a second diffraction grating 112 having a lower diffraction efficiency than the first grating 111, such that a small portion of the image bearing radiation from the projector 101 becomes diffracted out from the waveguide 110 toward the inlet 104 of the viewing element 102. The reduced efficiency of the second diffraction grating compared with the first grating, serves to limit the amount of light from the projector 101 which becomes directed into the viewing element 102, so that the light from the projector 101 does not obscure the view of the outside scene. The second grating 112 may similarly comprise a region of the waveguide 110 having a periodic variation in refractive index or a blazed grating for example, and extends substantially across the diameter of the inlet 104 to the viewing element 102, so that the remainder of the image bearing radiation can continue along the waveguide 110 and enter the viewing element 102 from all positions across the inlet 104. Accordingly, the image from the projector 101 becomes directed into the inlet 104 of the viewing element 102 from a distributed position across the inlet 104, thereby stimulating the viewing element 102 across the entire field of view.

The radiation generated by the projector 101 is arranged to comprise wavelengths characteristic of green light, such as 530 nm±15 nm. This is because the light from the outside scene, particularly at night, will comprise radiation having a wavelength characteristic of the near infra-red region of the spectrum, typically 600 nm to 900 nm. The first and second grating 111, 112 are arranged to diffract radiation having a wavelength in the green region of the spectrum and as such comprise a periodic variation in refractive index, whereby the repeat distance, namely the pitch is substantially 400 nm. The first and second gratings are thus largely insensitive to radiation having a longer wavelength, such as in the near infra-red region of the spectrum. Accordingly, the second grating 112 is substantially transmissive to radiation from the outside scene and therefore presents minimal obstruction to radiation entering the viewing element 102 through the inlet 104 from the outside scene.

Since the radiation from the outside scene which enters the viewing element 102 will typically comprise a low luminance, the housing 103 may further comprise a image intensifier tube 113, which intensifies the radiation entering the housing 103 so that the view of the outside scene is more discernable to the user (not shown).

From the foregoing therefore it is evident that the image combiner and viewing device provide for an improved view of a scene in reduced lighting conditions, by minimising obstruction of the optical inlet to the device, while also enabling symbology to be superimposed on the view of the scene.

The invention claimed is:

1. A viewing device for viewing in reduced lighting conditions, comprising:
   an image projector for generating a first image comprising image bearing light in a first range of non-infrared wavelengths;
   an image combiner comprising:
      a waveguide having an input diffraction grating and an output diffraction grating,
      the input diffraction grating configured to receive the image bearing light in the first range of non-infrared wavelengths from the image projector and further configured to direct the received image-bearing light along the waveguide towards the output diffraction grating,
      the output diffraction grating arranged to direct the image-bearing light in the first range of non-infrared wavelengths out of the waveguide along a viewing direction,
      the image combiner being further arranged to receive, along the viewing direction under said reduced lighting conditions, image-bearing light of an external scene including light in a second range of infrared wavelengths, whereby the image-bearing light of the external scene passes along the viewing direction through the waveguide and through the output diffraction grating, the output diffraction grating being substantially transparent and insensitive to the image-bearing light passing therethrough from the external scene in the second range of infrared wavelengths, such that the first image in the first range of non-infrared wavelengths may appear combined with the image-bearing light of the external scene in the second range of infrared wavelengths when viewed along the viewing direction; and a lens arrangement having an inlet aperture for receiving the combined image bearing light of the first image and of the external scene into the lens arrangement, an outlet for viewing the combined image-bearing light, and an image intensifier for intensifying the combined image bearing light such that the external scene may be viewed under said reduced lighting conditions combined with the first image.

2. The viewing device according to claim 1, configured to combine the first image which contains generated symbology and the image-bearing light of the external scene which contains the view of the outside scene received under reduced lighting conditions, the viewing device being arranged to present the combined image to a user.

3. The viewing device according to claim 2, wherein the waveguide input for receiving the first image is disposed at a first position on the waveguide and the output diffraction grating is disposed at a second position on the waveguide.

4. The viewing device according to claim 3, wherein the first position is displaced along the waveguide with respect to the second position.

5. The viewing device according to claim 4, wherein the waveguide is positioned relative to the lens arrangement such that the output diffraction grating extends substantially across the inlet aperture.

6. The viewing device according to claim 5, wherein the input for receiving the first image comprises:
an input diffraction grating.

7. The viewing device as claimed in claim 6, wherein the first range of non-infrared wavelengths comprises:
light including green light.

8. The viewing device according to claim 5, wherein a pitch of the output diffraction grating is selected so the output diffraction grating substantially diffracts light in the first range of non-infrared wavelengths and substantially transmits light in the second range of infrared wavelengths.

9. The viewing device according to claim 5, wherein the image combiner is arranged to limit the amount of light from the image projector being output from the waveguide so as not to obscure the image-bearing light of the external scene of said reduced lighting conditions when being viewed combined with the first image.

10. The viewing device according to claim 2, wherein the image combiner is arranged to limit the amount of light from the image projector being output from the waveguide so as not to obscure the image-bearing light of the external scene of said reduced lighting conditions when being viewed combined with the first image.

11. The viewing device according to claim 2, wherein the first image is a static image of symbology generated by the image projector and the image-bearing light of the external scene is a dynamic image representative of an outside world scene.

12. The viewing device according to claim 1, wherein the waveguide input for receiving the first image is disposed at a first position on the waveguide and the output diffraction grating is disposed at a second position on the waveguide.

13. The viewing device according to claim 12, wherein the first position is displaced along the waveguide with respect to the second position.

14. The viewing device according to claim 13, wherein the second position comprises a distributed position, such that the output diffraction grating is arranged to extend along the waveguide.

15. The viewing device according to claim 12, wherein the second position comprises:
a distributed position, such that the output diffraction grating is arranged to extend along the waveguide.

16. The viewing device according to claim 1, wherein the waveguide is positioned relative to the lens arrangement such that the output diffraction grating extends substantially across the inlet aperture.

17. The viewing device according to claim 1, wherein the waveguide input for receiving the first image comprises:
an input diffraction grating.

18. The viewing device as claimed in claim 1, wherein the first range of non-infrared wavelengths comprises:
light including green light.

19. The viewing device according to claim 1, wherein a pitch of the output diffraction grating is selected so the output diffraction grating substantially diffracts light in the first range of non-infrared wavelengths and substantially transmits and is insensitive to light in the second range of infrared wavelengths.

20. The viewing device according to claim 1, wherein the image combiner is arranged to limit the amount of light from the image projector being output from the waveguide so as not to obscure the image-bearing light of the external scene of said reduced lighting conditions when being viewed combined with the first image.

21. The viewing device according to claim 1, wherein the output diffraction grating is configured to allow all of the image-bearing light in the second range of infrared wavelengths to pass through the output diffraction grating without diffraction.

* * * * *